United States Patent
Ramachandran et al.

(10) Patent No.: US 10,133,754 B2
(45) Date of Patent: Nov. 20, 2018

(54) PEER-TO-PEER PICTURE SHARING USING CUSTOM BASED RULES FOR MINIMAL POWER CONSUMPTION AND BETTER USER EXPERIENCE

(71) Applicant: QUALCOMM Incorporated, San Diego, CA (US)

(72) Inventors: Krishnan Ramachandran, San Diego, CA (US); Paul G. Phillips, San Diego, CA (US); Enrico Ros, San Diego, CA (US); Babak Forutanpour, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 469 days.

(21) Appl. No.: 13/763,730

(22) Filed: Feb. 10, 2013

(65) Prior Publication Data

US 2014/0229538 A1    Aug. 14, 2014

(51) Int. Cl.
*H04L 15/16* (2006.01)
*G06F 17/30* (2006.01)
*H04W 4/21* (2018.01)

(52) U.S. Cl.
CPC .. *G06F 17/30265* (2013.01); *G06F 17/30029* (2013.01); *G06F 17/30247* (2013.01); *G06F 17/30793* (2013.01); *H04W 4/21* (2018.02); *Y02D 10/45* (2018.01); *Y02D 70/00* (2018.01); *Y02D 70/122* (2018.01); *Y02D 70/124* (2018.01); *Y02D 70/1262* (2018.01); *Y02D 70/142* (2018.01); *Y02D 70/144* (2018.01); *Y02D 70/164* (2018.01); *Y02D 70/22* (2018.01); *Y02D 70/23* (2018.01)

(58) Field of Classification Search
CPC .......... G06F 17/30; G06F 15/16; G06F 50/01
USPC ........ 709/201, 204, 224; 707/201, 627, 706, 707/758, 999; 455/408; 370/254, 311, 370/338, 400
See application file for complete search history.

(56) References Cited

U.S. PATENT DOCUMENTS

| | | | |
|---|---|---|---|
| 6,986,154 B1 | 1/2006 | Price et al. | |
| 7,849,420 B1 | 12/2010 | Amidon et al. | |
| 7,937,759 B2 * | 5/2011 | Wu et al. | 726/22 |
| 8,897,596 B1 * | 11/2014 | Passmore et al. | 382/284 |
| 2003/0078968 A1 | 4/2003 | Needham et al. | |
| 2003/0191753 A1 | 10/2003 | Hoch | |

(Continued)

FOREIGN PATENT DOCUMENTS

| | | |
|---|---|---|
| CN | 1514578 A | 7/2004 |
| CN | 1659531 A | 8/2005 |

(Continued)

OTHER PUBLICATIONS

International Search Report and Written Opinion—PCT/US2014/015025—ISA/EPO—dated Nov. 10, 2014.

*Primary Examiner* — Dhairya A Patel
(74) *Attorney, Agent, or Firm* — MG-IP Law, P.C.

(57) ABSTRACT

The disclosure is directed to content sharing. An aspect defines a filter having at least one parameter for receiving content and detects a content device. The content device is a peer device with sharable content. The aspect further queries the content device for desired content from the sharable content and receives the desired content from the content device. The desired content matches the at least one parameter.

38 Claims, 11 Drawing Sheets

(56) References Cited

U.S. PATENT DOCUMENTS

| | | |
|---|---|---|
| 2004/0107242 A1 | 6/2004 | Vert et al. |
| 2005/0058337 A1* | 3/2005 | Fujimura et al. .............. 382/159 |
| 2006/0195441 A1 | 8/2006 | Julia et al. |
| 2007/0083527 A1 | 4/2007 | Wadler et al. |
| 2007/0161402 A1 | 7/2007 | Ng et al. |
| 2008/0080392 A1 | 4/2008 | Walsh et al. |
| 2009/0027505 A1* | 1/2009 | Jung .................. H04N 5/23206 348/207.1 |
| 2009/0077220 A1* | 3/2009 | Svendsen et al. ............ 709/224 |
| 2010/0048242 A1* | 2/2010 | Rhoads et al. ............. 455/556.1 |
| 2010/0251109 A1 | 9/2010 | Jin et al. |
| 2011/0022578 A1 | 1/2011 | Fotev |
| 2011/0161409 A1* | 6/2011 | Nair .......................... G06F 8/38 709/203 |
| 2011/0276396 A1 | 11/2011 | Rathod |
| 2011/0302275 A1 | 12/2011 | Prodan et al. |
| 2012/0011197 A1* | 1/2012 | Arisawa ................ H04L 67/306 709/203 |
| 2012/0027256 A1 | 2/2012 | Kiyohara et al. |
| 2012/0221639 A1* | 8/2012 | Mallet et al. .................. 709/204 |
| 2012/0317198 A1* | 12/2012 | Patton et al. .................. 709/204 |
| 2013/0013683 A1* | 1/2013 | Elliott ........................... 709/204 |
| 2013/0103742 A1* | 4/2013 | Hsi ................... G06F 17/30274 709/203 |
| 2013/0150122 A1* | 6/2013 | Kulas .................. H04M 1/0264 455/556.1 |

FOREIGN PATENT DOCUMENTS

| | | |
|---|---|---|
| CN | 102314482 A | 1/2012 |
| JP | 2011239069 A | 11/2011 |
| WO | 2006133737 A1 | 12/2006 |

* cited by examiner

PEER-TO-PEER PICTURE SHARING USING CUSTOM BASED RULES FOR MINIMAL POWER CONSUMPTION AND BETTER USER EXPERIENCE

BACKGROUND

The disclosure is directed to peer-to-peer picture sharing using custom based rules for minimal power consumption and better user experience.

Currently, picture and video sharing is based on server interaction and users have few choices in setting custom preferences regarding the sharing/receiving of pictures and video. Additionally, various solutions are available to share pictures based on facial recognition. For example, a user can upload a picture to a social networking website, and when members of the social networking site are identified in the picture, the website can tag the members in the picture and share the picture with the tagged members.

SUMMARY

The disclosure is directed to content sharing. An aspect includes a method for content sharing. The method includes defining a filter having at least one parameter for receiving content, and detecting a content device. The content device is a peer device with sharable content. The method further includes querying the content device for desired content from the sharable content, and receiving the desired content from the content device. The desired content matches the at least one parameter . . . .

Another aspect can include an apparatus for content sharing. The apparatus includes logic configured to define a filter having at least one parameter for receiving content and logic configured to detect a content device. The content device is a peer device with sharable content. The apparatus further includes logic configured to query the content device for desired content from the sharable content, and logic configured to receive the desired content from the content device. The desired content matches the at least one parameter . . . .

Another aspect can include an apparatus for content sharing. The apparatus includes means for defining a filter having at least one parameter for receiving content, and means for detecting a content device. The content device is a peer device with sharable content. The apparatus further includes means for querying the content device for desired content from the sharable content, and means for receiving the desired content from the content device. The desired content matches the at least one parameter . . . .

Another aspect can include a non-transitory computer-readable medium for content sharing. The computer-readable medium includes at least one instruction to define a filter having at least one parameter for receiving content, and at least one instruction to detect a content device. The content device is a peer device with sharable content. The computer-readable medium further includes at least one instruction to query the content device for desired content from the sharable content, and at least one instruction to receive the desired content from the content device. The desired content matches the at least one parameter.

BRIEF DESCRIPTION OF THE DRAWINGS

A more complete appreciation of the various aspects of the disclosure and many of the attendant advantages thereof will be readily obtained as the same becomes better understood by reference to the following detailed description when considered in connection with the accompanying drawings which are presented solely for illustration and not limitation of the disclosure, and in which.

DETAILED DESCRIPTION

Figure 1:
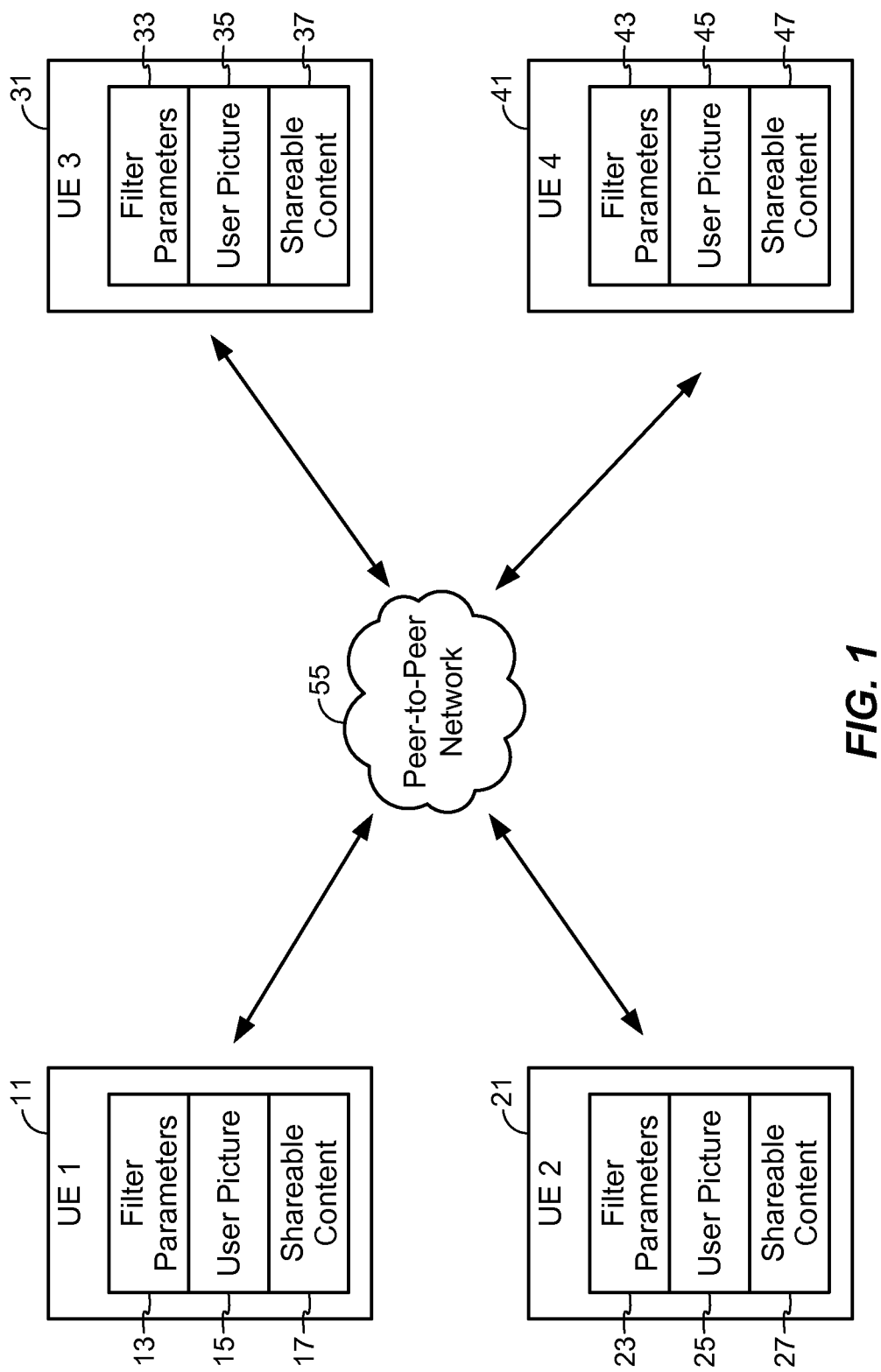
FIG. 1 illustrates an overview of the various aspects.

Aspects of the disclosure are disclosed in the following description and related drawings. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

The terminology used herein is for the purpose of describing particular implementations only and is not intended to be limiting of implementations of the disclosure. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof. Additionally, as used herein the term "non-transitory" does not exclude any physical storage medium, but only excludes an interpretation that the medium can be construed as a transitory propagating signal.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

A client device, referred to herein as a user equipment (UE), may be mobile or stationary, and may communicate with a radio access network (RAN). As used herein, the term "UE" may be referred to interchangeably as an "access terminal" or "AT", a "wireless device", a "subscriber device", a "subscriber terminal", a "subscriber station", a "user terminal" or UT, a "mobile terminal", a "mobile station" and variations thereof. Generally, UEs can communicate with a core network via the RAN, and through the core network the UEs can be connected with external networks such as the Internet. Of course, other mechanisms of connecting to the core network and/or the Internet are also possible for the UEs, such as over wired access networks, WiFi networks (e.g., based on IEEE 802.11, etc.) and so on. UEs can be embodied by any of a number of types of devices including but not limited to PC cards, compact flash devices, external or internal modems, wireless or wireline phones, and so on. A communication link through which UEs can send signals to the RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to an uplink/reverse or downlink/forward traffic channel.

Currently, picture and video sharing is based on server interaction and users have few choices in setting custom preferences regarding the sharing/receiving of pictures and video. Additionally, while various solutions are available to share pictures based on facial recognition, users have little control over what pictures get shared. For example, a user can upload a picture to a social networking website, and when members of the social networking site are identified in the picture, the website will tag the members in the picture and share the picture with the tagged members. If the user does not want the picture to be shared, the only option is typically to un-tag the user in the picture.

The various aspects provide a peer-to-peer (P2P) solution for content (e.g., picture, video, etc.) sharing. When a user takes a picture or records a video with his or her UE, the UE can share the picture or video with other users based on the specific preferences of each user. The user preferences effectively filter out any unwanted pictures or videos from the sharing UE, so that only the desired pictures or videos are transferred. As used herein, "content" corresponds to data that is configured to be accessed or processed by a client or server application. For example, content can include media content (e.g., audio data, image data, text data, video data, etc.), or content can include non-media content (e.g., a Word or Excel document, a client-executable application, etc.).

FIG. 1 illustrates an overview of the various aspects. In FIG. 1, UE 1 11, UE 2 21, UE 3 31, and UE 4 41 communicate over a P2P network 55. UE 1 11 includes filter parameters 13, a picture of the user's face 15, and shareable content 17, such as pictures and/or videos. UE 2 21 includes filter parameters 23, a picture of the user's face 25, and shareable content 27, such as pictures and/or videos. UE 3 31 includes filter parameters 33, a picture of the user's face 35, and shareable content 37, such as pictures and/or videos. UE 4 41 includes filter parameters 43, a picture of the user's face 45, and shareable content 47, such as pictures and/or videos.

Figure 2:
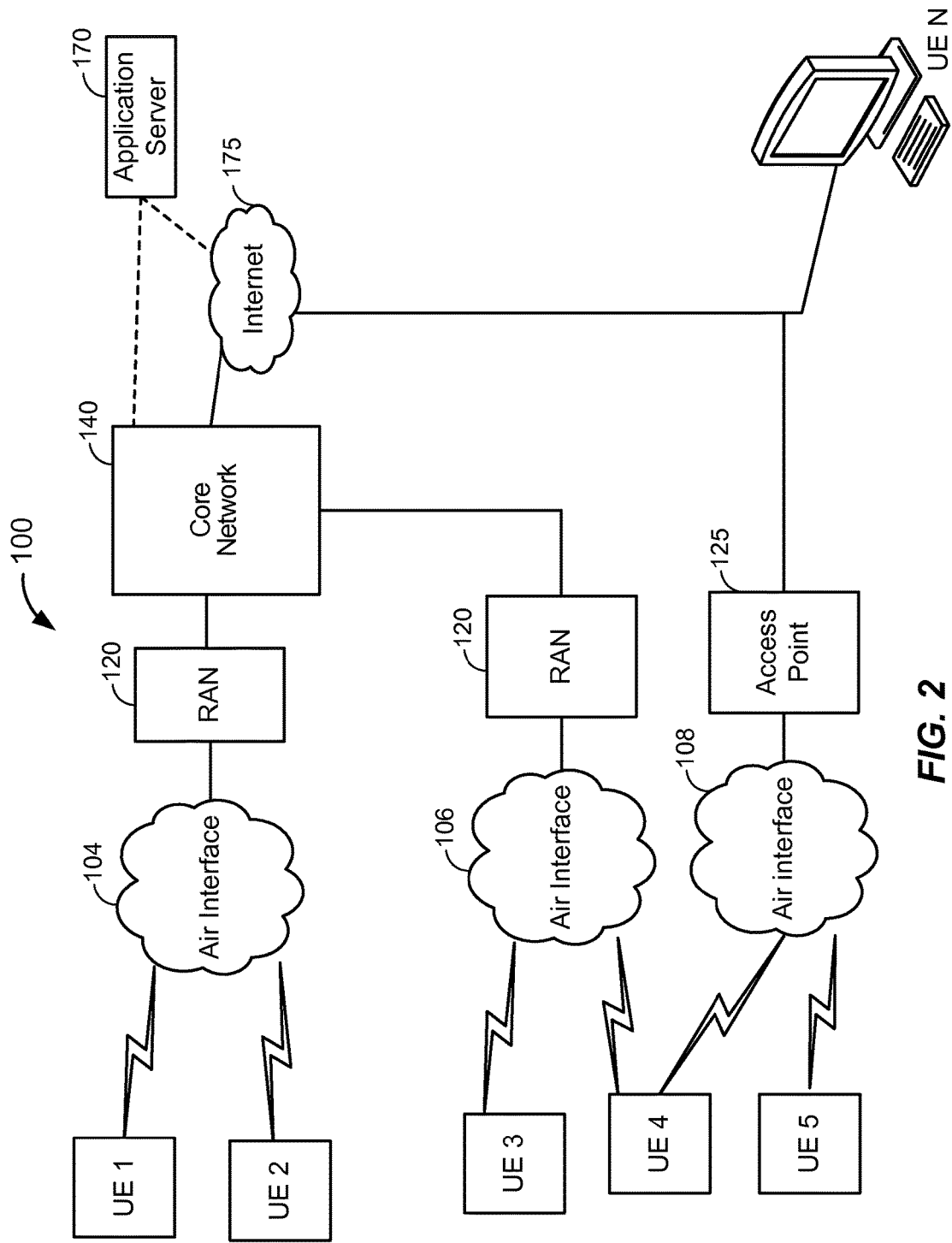
FIG. 2 illustrates a high-level system architecture of a wireless communications system in accordance with an aspect.

FIG. 2 illustrates a high-level system architecture of a wireless communications system 100 in accordance with an aspect of the disclosure. The wireless communications system 100 contains UEs 1 . . . N. The UEs 1 . . . N can include cellular telephones, personal digital assistant (PDAs), pagers, a laptop computer, a desktop computer, and so on.

Referring to FIG. 2, UEs 1 . . . N are configured to communicate with an access network (e.g., the RAN 120, an access point 125, etc.) over a physical communications interface or layer, shown in FIG. 2 as air interfaces 104, 106, 108 and/or a direct wired connection. The air interfaces 104 and 106 can comply with a given cellular communications protocol (e.g., Code Division Multiple Access (CDMA), Evolution-Data Optimized (EV-DO), Evolved High Rate Packet Data (eHRPD), Global System for Mobile Communications (GSM), Enhanced Data Rates for GSM Evolution (EDGE), Wideband CDMA (W-CDMA), Long-Term Evolution (LTE), etc.), while the air interface 108 can comply with a wireless Internet protocol (IP) (e.g., IEEE 802.11). The RAN 120 includes a plurality of access points that serve UEs over air interfaces, such as the air interfaces 104 and 106. The access points in the RAN 120 can be referred to as access nodes or ANs, access points or APs, base stations or BSs, Node Bs, eNode Bs, and so on. These access points can be terrestrial access points (or ground stations), or satellite access points. The RAN 120 is configured to connect to a core network 140 that can perform a variety of functions, including bridging circuit switched (CS) calls between UEs served by the RAN 120 and other UEs served by the RAN 120 or a different RAN altogether, and can also mediate an exchange of packet-switched (PS) data with external networks such as Internet 175. The Internet 175 includes a number of routing agents and processing agents (not shown in FIG. 2 for the sake of convenience). In FIG. 2, UE N is shown as connecting to the Internet 175 directly (i.e., separate from the core network 140, such as over an Ethernet connection of WiFi or 802.11-based network). The Internet 175 can thereby function to bridge packet-switched data communications between UE N and UEs 1 . . . N via the core network 140. Also shown in FIG. 2 is the access point 125 that is separate from the RAN 120. The access point 125 may be connected to the Internet 175 independent of the core network 140 (e.g., via an optical communication system such as FiOS, a cable modem, etc.). The air interface 108 may serve UE 4 or UE 5 over a local wireless connection, such as IEEE 802.11 in an example. UE N is shown as a desktop computer with a wired connection to the Internet 175, such as a direct connection to a modem or router, which can correspond to the access point 125 itself in an example (e.g., for a WiFi router with both wired and wireless connectivity).

Referring to FIG. 2, an application server 170 is shown as connected to the Internet 175, the core network 140, or both. The application server 170 can be implemented as a plurality of structurally separate servers, or alternately may correspond to a single server. As will be described below in more detail, the application server 170 is configured to support one or more communication services (e.g., Voice-over-Internet Protocol (VoIP) sessions, Push-to-Talk (PTT) sessions, group communication sessions, social networking services, etc.) for UEs that can connect to the application server 170 via the core network 140 and/or the Internet 175.

Figure 3:
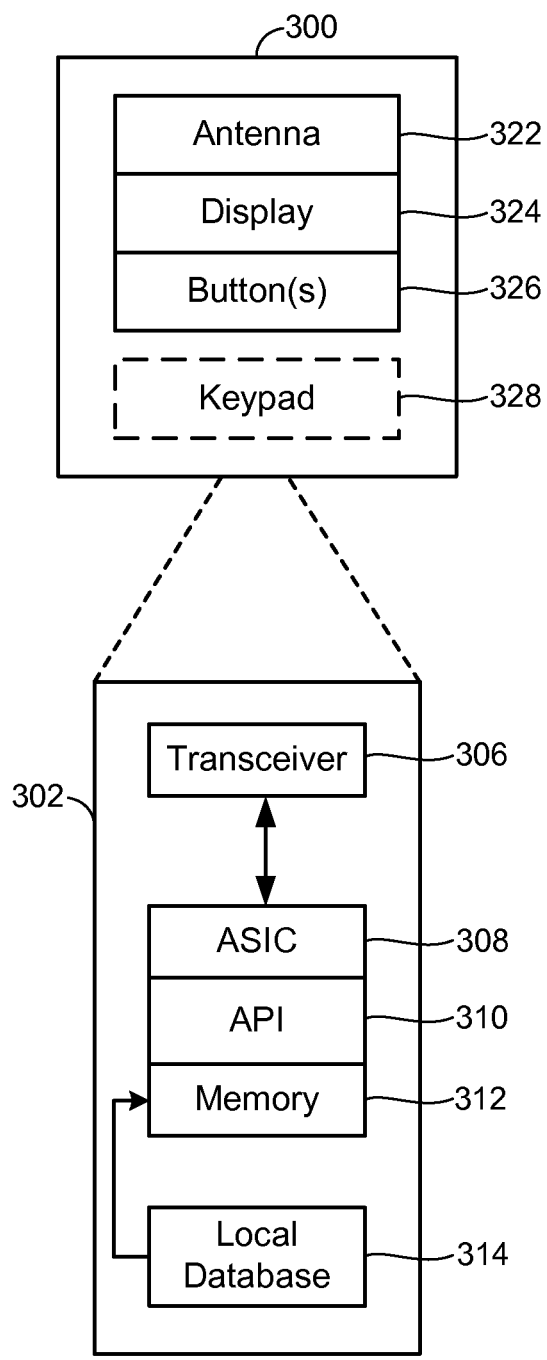
FIG. 3 illustrates examples of user equipment (UEs) in accordance with an aspect.

FIG. 3 illustrates an example UE 300 in accordance with the various aspects. As shown in FIG. 3, UE 300 includes an antenna 322, display 324, one or more buttons 326 (e.g., a PTT button, a power button, a volume control button, etc.), and a keypad 328, among other components, as is known in the art. Display 324 can be a touchscreen display, in which case keypad 328 is optional and may not be part of UE 300, as is known in the art. Antenna 322 can be one or more external antennas and/or one or more integrated antennas that are built into the external casing of UE 300, including but not limited to WiFi antennas, cellular antennas, satellite position system (SPS) antennas (e.g., global positioning system (GPS) antennas), and so on.

While internal components of UE 300 can be embodied with different hardware configurations, a basic high-level UE configuration for internal hardware components is shown as platform 302 in FIG. 3. The platform 302 can receive and execute software applications, data and/or commands transmitted from the RAN 120 that may ultimately come from the core network 140, the Internet 175 and/or other remote servers and networks (e.g., application server 170, web uniform resource locators (URLs), etc.). The platform 302 can also independently execute locally stored applications without RAN interaction. The platform 302 can include a transceiver 306 operably coupled to an application specific integrated circuit (ASIC) 308, or other processor, microprocessor, logic circuit, or other data processing device. The ASIC 308 or other processor executes the application programming interface (API) 310 layer that interfaces with any resident programs in the memory 312 of the wireless device. The memory 312 can be comprised of read-only memory (ROM) or random-access memory (RAM), electrically erasable programmable ROM (EEPROM), flash cards, or any memory common to computer platforms. The platform 302 also can include a local database 314 that can store applications not actively used in memory 312, as well as other data. The local database 314 is typically a flash memory cell, but can be any secondary storage device as known in the art, such as magnetic media, EEPROM, optical media, tape, soft or hard disk, or the like.

Accordingly, an aspect of the disclosure can include a UE (e.g., UE 300, etc.) including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 308, memory 312, API 310 and local database 314 may all be used cooperatively to load, store and execute the various functions disclosed herein and thus the logic to perform these functions may be distributed over various elements. Alternatively, the functionality could be incorporated into one discrete component. Therefore, the features of the UE 300 in FIG. 3 are to be considered merely illustrative and the disclosure is not limited to the illustrated features or arrangement.

The wireless communication between the UE 300 and the RAN 120 can be based on different technologies, such as CDMA, W-CDMA, time division multiple access (TDMA), frequency division multiple access (FDMA), Orthogonal Frequency Division Multiplexing (OFDM), GSM, or other protocols that may be used in a wireless communications network or a data communications network. As discussed in the foregoing and known in the art, voice transmission and/or data can be transmitted to the UEs from the RAN using a variety of networks and configurations. Accordingly, the illustrations provided herein are not intended to limit the aspects of the disclosure and are merely to aid in the description of aspects of the disclosure.

Figure 4:
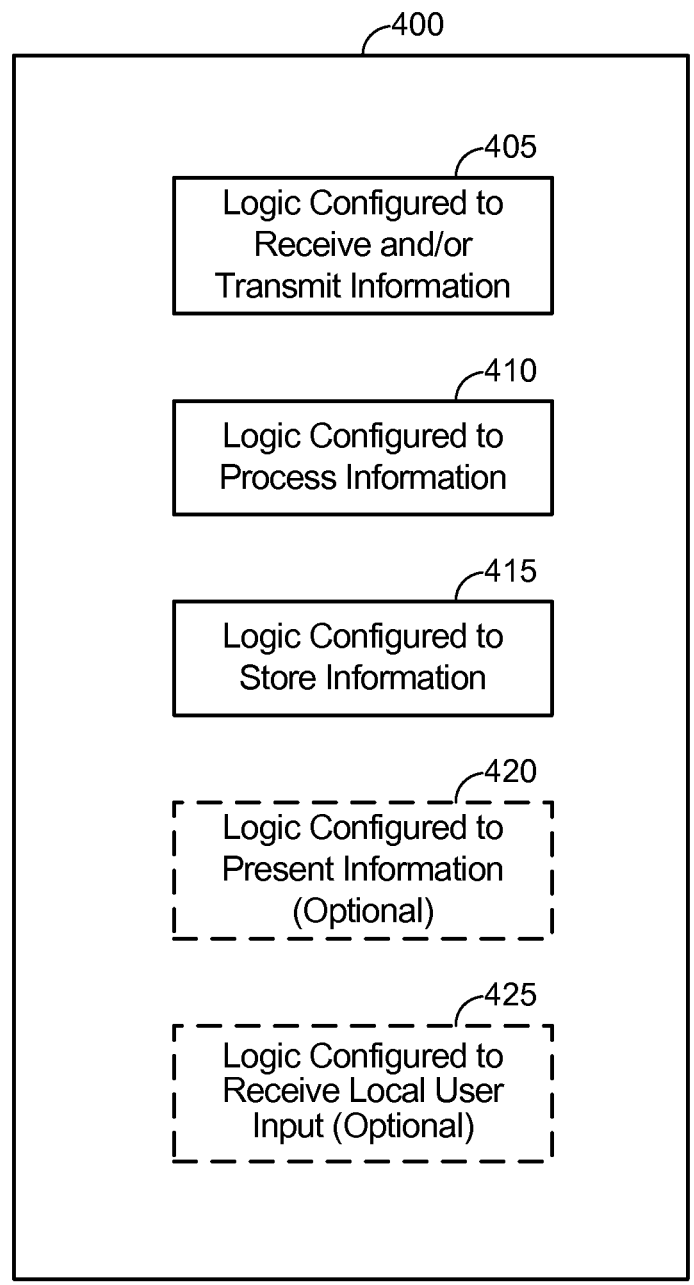
FIG. 4 illustrates a communication device that includes logic configured to perform functionality in accordance with an aspect.

FIG. 4 illustrates a communication device 400 that includes logic configured to perform functionality. The communication device 400 can correspond to any of the above-noted communication devices, including but not limited to UE 300, any component of the RAN 120, any component of the core network 140, any components coupled with the core network 140 and/or the Internet 175 (e.g., the application server 170), and so on. Thus, communication device 400 can correspond to any electronic device that is configured to communicate with (or facilitate communication with) one or more other entities over the wireless communications system 100 of FIG. 2.

Referring to FIG. 4, the communication device 400 includes logic configured to receive and/or transmit information 405. In an example, if the communication device 400 corresponds to a wireless communications device (e.g., UE 300), the logic configured to receive and/or transmit information 405 can include a wireless communications interface (e.g., Bluetooth, WiFi, 2G, CDMA, W-CDMA, 3G, 4G, LTE, etc.) such as a wireless transceiver and associated hardware (e.g., an RF antenna, a MODEM, a modulator and/or demodulator, etc.). In another example, the logic configured to receive and/or transmit information 405 can correspond to a wired communications interface (e.g., a serial connection, a universal serial bus (USB) or Firewire connection, an Ethernet connection through which the Internet 175 can be accessed, etc.). Thus, if the communication device 400 corresponds to some type of network-based server (e.g., the application 170), the logic configured to receive and/or transmit information 405 can correspond to an Ethernet card, in an example, that connects the network-based server to other communication entities via an Ethernet protocol. In a further example, the logic configured to receive and/or transmit information 405 can include sensory or measurement hardware by which the communication device 400 can monitor its local environment (e.g., an accelerometer, a temperature sensor, a light sensor, an antenna for monitoring local radio frequency (RF) signals, etc.). The logic configured to receive and/or transmit information 405 can also include software that, when executed, permits the associated hardware of the logic configured to receive and/or transmit information 405 to perform its reception and/or transmission function(s). However, the logic configured to receive and/or transmit information 405 does not correspond to software alone, and the logic configured to receive and/or transmit information 405 relies at least in part upon hardware to achieve its functionality.

Referring to FIG. 4, the communication device 400 further includes logic configured to process information 410. In an example, the logic configured to process information 410 can include at least a processor. Example implementations of the type of processing that can be performed by the logic configured to process information 410 includes but is not limited to performing determinations, establishing connections, making selections between different information options, performing evaluations related to data, interacting with sensors coupled to the communication device 400 to perform measurement operations, converting information from one format to another (e.g., between different protocols such as .wmv to .avi, etc.), and so on. For example, the processor included in the logic configured to process information 410 can correspond to a general purpose processor, a digital signal processor (DSP), an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The logic configured to process information 410 can also include software that, when executed, permits the associated hardware of the logic configured to process information 410 to perform its processing function(s). However, the logic configured to process information 410 does not correspond to software alone, and the logic configured to process information 410 relies at least in part upon hardware to achieve its functionality.

Referring to FIG. 4, the communication device 400 further includes logic configured to store information 415. In an example, the logic configured to store information 415 can include at least a non-transitory memory and associated hardware (e.g., a memory controller, etc.). For example, the non-transitory memory included in the logic configured to store information 415 can correspond to RAM, flash memory, ROM, erasable programmable ROM (EPROM), EEPROM, registers, hard disk, a removable disk, a compact disk ROM (CD-ROM), or any other form of storage medium known in the art. The logic configured to store information 415 can also include software that, when executed, permits the associated hardware of the logic configured to store information 415 to perform its storage function(s). However, the logic configured to store information 415 does not correspond to software alone, and the logic configured to store information 415 relies at least in part upon hardware to achieve its functionality.

Referring to FIG. 4, the communication device 400 further optionally includes logic configured to present information 420. In an example, the logic configured to present information 420 can include at least an output device and associated hardware. For example, the output device can include a video output device (e.g., a display screen, a port that can carry video information such as USB, high definition multimedia interface (HDMI), etc.), an audio output device (e.g., speakers, a port that can carry audio information such as a microphone jack, USB, HDMI, etc.), a vibration device and/or any other device by which information can be formatted for output or actually outputted by a user or operator of the communication device 400. For example, if the communication device 400 corresponds to UE 300 as shown in FIG. 3, the logic configured to present information 420 can include the display 324 of UE 300. In a further example, the logic configured to present information 420 can be omitted for certain communication devices, such as network communication devices that do not have a local user (e.g., network switches or routers, remote servers, etc.). The logic configured to present information 420 can also include software that, when executed, permits the associated hardware of the logic configured to present information 420 to perform its presentation function(s). However, the logic configured to present information 420 does not correspond to software alone, and the logic configured to present information 420 relies at least in part upon hardware to achieve its functionality.

Referring to FIG. 4, the communication device 400 further optionally includes logic configured to receive local user input 425. In an example, the logic configured to receive local user input 425 can include at least a user input device and associated hardware. For example, the user input device can include buttons, a touchscreen display, a keyboard, a camera, an audio input device (e.g., a microphone or a port that can carry audio information such as a microphone jack, etc.), and/or any other device by which information can be received from a user or operator of the communication device 400. For example, if the communication device 400 corresponds to UE 300 as shown in FIG. 3, the logic configured to receive local user input 425 can include the keypad 328, button 326, or display 324, etc. In a further example, the logic configured to receive local user input 425 can be omitted for certain communication devices, such as network communication devices that do not have a local user (e.g., network switches or routers, remote servers, etc.). The logic configured to receive local user input 425 can also include software that, when executed, permits the associated hardware of the logic configured to receive local user input 425 to perform its input reception function(s). However, the logic configured to receive local user input 425 does not correspond to software alone, and the logic configured to receive local user input 425 relies at least in part upon hardware to achieve its functionality.

Referring to FIG. 4, while the configured logics of 405 through 425 are shown as separate or distinct blocks in FIG. 4, it will be appreciated that the hardware and/or software by which the respective configured logic performs its functionality can overlap in part. For example, any software used to facilitate the functionality of the configured logics of 405 through 425 can be stored in the non-transitory memory associated with the logic configured to store information 415, such that the configured logics of 405 through 425 each performs their functionality (i.e., in this case, software execution) based in part upon the operation of software stored by the logic configured to store information 415. Likewise, hardware that is directly associated with one of the configured logics can be borrowed or used by other configured logics from time to time. For example, the processor of the logic configured to process information 410 can format data into an appropriate format before being transmitted by the logic configured to receive and/or transmit information 405, such that the logic configured to receive and/or transmit information 405 performs its functionality (i.e., in this case, transmission of data) based in part upon the operation of hardware (i.e., the processor) associated with the logic configured to process information 410.

Generally, unless stated otherwise explicitly, the phrase "logic configured to" as used throughout this disclosure is intended to invoke an aspect that is at least partially implemented with hardware, and is not intended to map to software-only implementations that are independent of hardware. Also, it will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic." Other interactions or cooperation between the logic in the various blocks will become clear to one of ordinary skill in the art from a review of the aspects described below in more detail.

Figure 5:
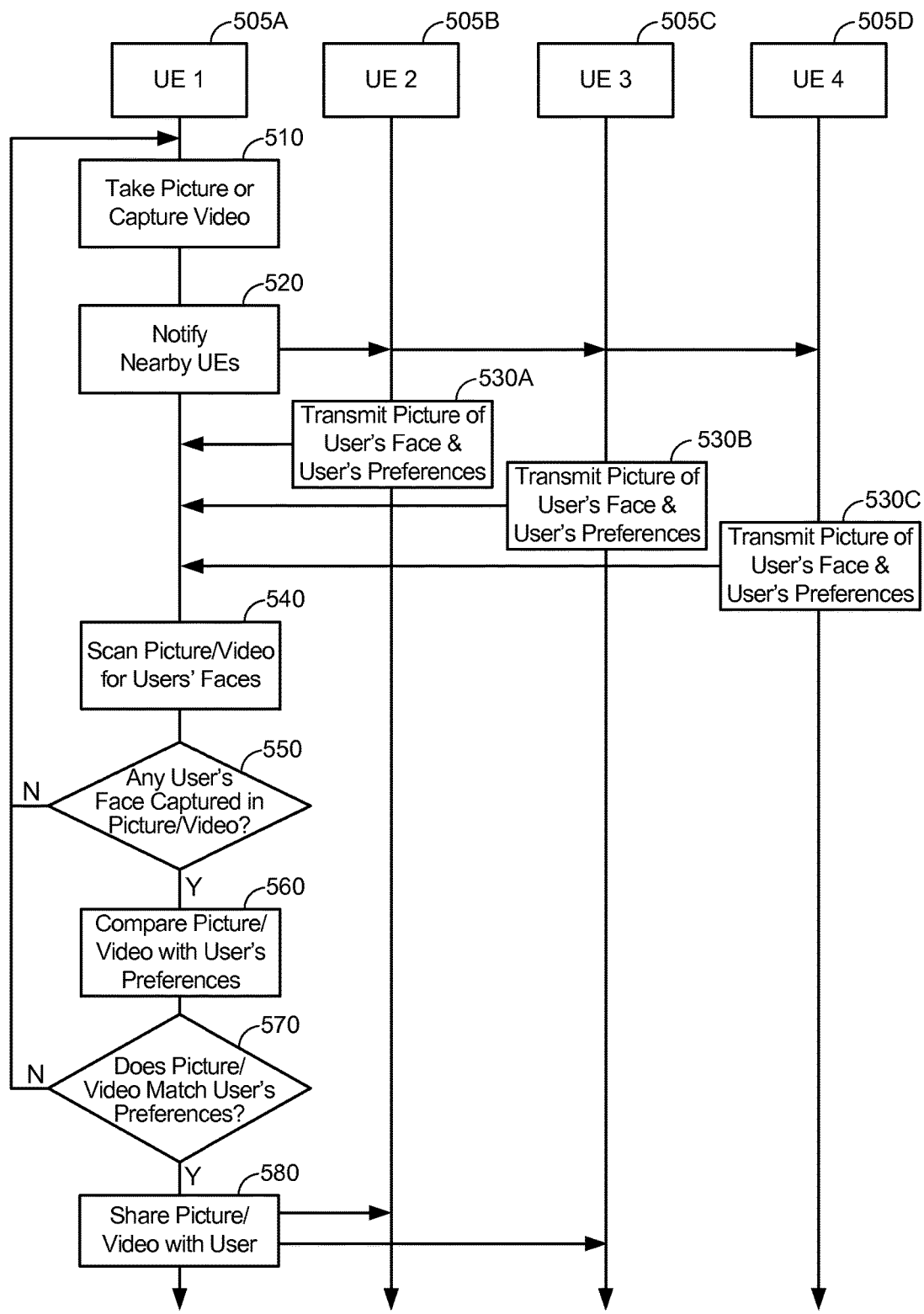
FIG. 5 illustrates an exemplary flow of an aspect in which a picture or video is shared among nearby users in response to a user taking the picture or capturing the video.

FIG. 5 illustrates an exemplary flow of an aspect in which a picture or video is shared among nearby users in response to a user taking the picture or capturing the video. "Nearby" users can be users within the same wireless local area network (WLAN), such as a Wi-Fi or Bluetooth network. The users preferably communicate in a P2P fashion to save wireless network bandwidth and reduce network congestion.

At 510, UE 1 505A takes a picture or captures a video. At 520, UE 1 505A transmits a message to nearby users notifying them that it has a picture or a video to share. In the example of FIG. 5, UE 2 505B, UE 3 505C, and UE 4 505D are nearby UE 1 505A. The message may be a P2P message, such as an AllJoyn™ message, by way of example and not limitation. AllJoyn™ is an open source P2P software development framework available from Qualcomm Incorporated® that enables ad-hoc, proximity-based, device-to-device communication without the use of an intermediary server. AllJoyn™ leverages Bluetooth and/or Wi-Fi director or other physical layers for the transport of data.

In an alternative aspect, instead of sending the notification in response to taking a picture or capturing a video, UE 1 505A may send the notification in response to entering the WLAN. That is, when a UE enters a WLAN, it may send a P2P message to other UEs in the WLAN notifying them that it has pictures and/or videos to share.

At 530A, UE 2 505B responds to the notification with a picture of UE 2 505B's user's face. UE 2 505B also transmits its user's preferences regarding the sharing of pictures and videos. The user picture and preferences may be transmitted in the same message or separate messages. If UE 2 505B does not send a picture of its user's face, UE 1 505A may also be able to obtain a picture of UE 2 505B's user through other means, such as by scanning tagged pictures on a social networking site to identify a picture of the user, etc. At 530B and 530C, UE 3 505C and UE 4 505D, respectively, also transmit user pictures and preferences.

At 540, UE 1 505A scans the picture or video for the received faces. At 550, UE 1 505A determines whether any of the received faces were captured in the picture or video. If none were, then the flow terminates until UE 1 505A takes another picture or captures another video. If, however, any of the nearby users' faces were captured in the picture or video, then at 560, UE 1 505A compares the picture or video to those users' preferences.

At 570, the UE 1 505A determines whether the picture or video matches the preferences of the users identified in 550. If it does not, then the flow terminates until the UE 1 505A takes another picture or captures another video. If it does, however, then at 580, the UE 1 505A shares the picture or video with the matching users. In the example of FIG. 5, the picture or video matched the preferences of the users of UE 2 505B and UE 3 505C.

UE 1 505A can transmit the picture or video as a P2P message over the WLAN. Alternatively, if UE 1 505A cannot transmit the picture or video to UE 2 505B and/or UE 3 505C over the WLAN, it can transmit it over any available network, including a cellular network, such as air interfaces 104 or 106. The UE 1 505A can upload the picture or video to a remote server or send it in a multimedia messaging service (MMS) message. The UE 1 505A can request that the server share the picture or video based on certain conditions, such as the UE 1 505A's battery level, the distance between the UE 1 505A and the other UEs, the available bandwidth being lower than a threshold, and the like.

The exemplary flow illustrated in FIG. 5 occurs in real or near real time. That is, the user takes the picture or captures the video and the users that may be in the picture or video are nearby. In an aspect, however, the UE 1 505A may continuously, or periodically, identify nearby UEs and ask them for a picture of their user and their user's preferences to determine if their users want any of the pictures or videos stored on UE 1 505A. The UE 1 505A may scan all the pictures and videos stored in its memory, only those pictures the user has marked as sharable, only pictures or videos taken since UE 1 505A last communicated with the nearby UE, etc.

Figure 6:
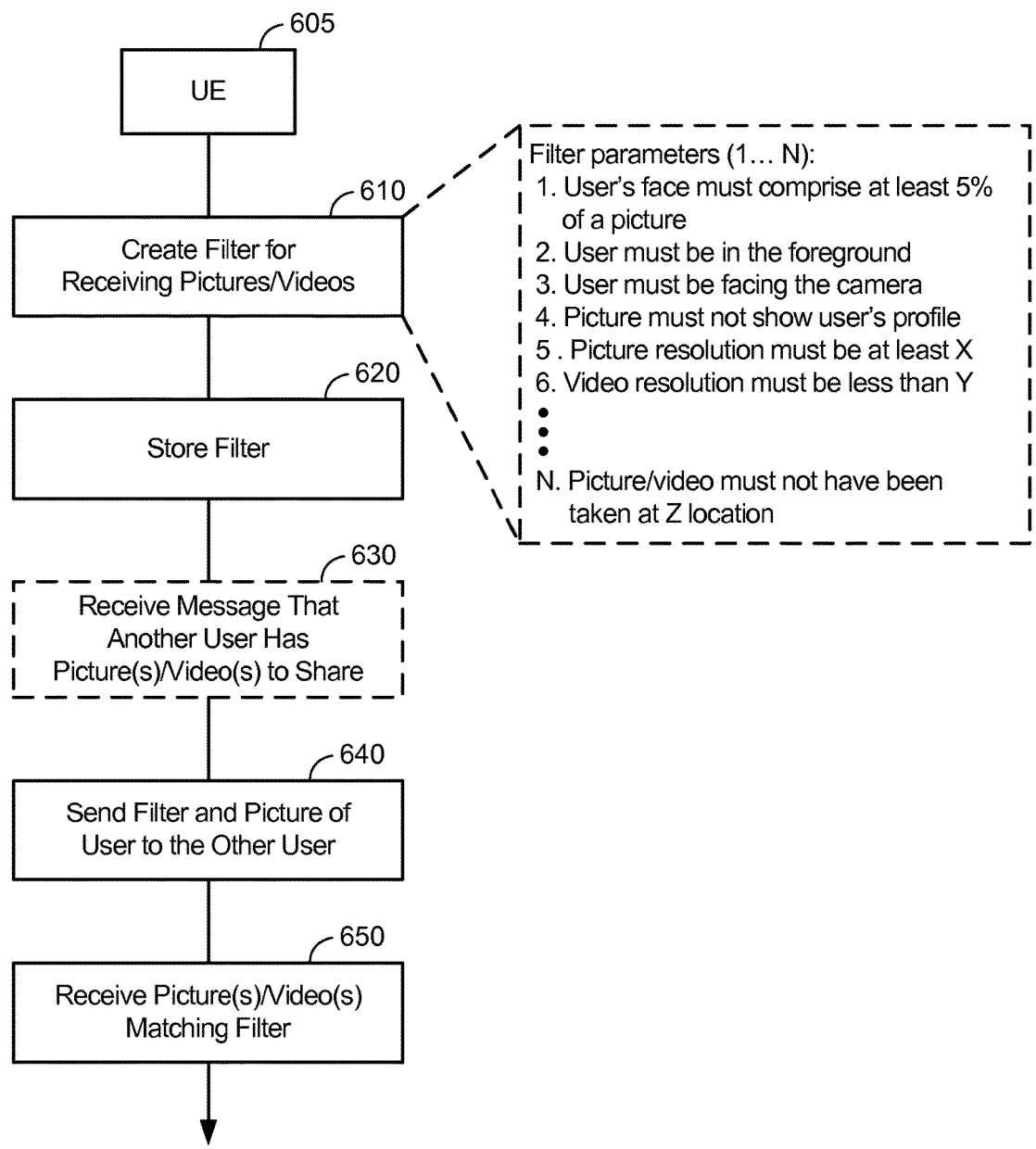
FIG. 6 illustrates an exemplary flow of an aspect in which a user sets and shares his or her picture and video sharing preferences with other users.

FIG. 6 illustrates an exemplary flow of an aspect in which a user sets and shares his or her picture and video sharing preferences with other users. At 610, UE 605 creates a filter comprising the user's preferences for receiving pictures and videos. The user preferences comprise criteria regarding how, or whether, the user wants pictures and videos shared with them. The criteria can include the user's prominence and/or posture in the picture or video, the user's location, the identities of other people or things in the pictures or videos, the amount of video or number of pictures the user would like to receive, the resolution of the pictures or videos, etc. The preferences can be defined by the user and/or automatically by the application. Certain preferences may be assigned default values until the user changes them.

For example, the user preferences can specify the minimum face size of the user. A user may not wish to receive pictures or videos in which the user is in the "background," which the user (or the application) may define as less than 3% of the picture.

If a user appears in a video, the user preferences can specify that the user would like to receive one minute of video before and one minute of video after the user's appearance in the video, rather than the entire video. Similarly, if the user appears in a picture of an event, the user may want all of the pictures or videos related to that event, even if he is not in all of them.

The user preferences can also specify that the user would like or not like to receive pictures or videos taken within or outside of specified geographical areas. For example, a user may not want to receive pictures of himself that are taken at a bar, but may wish to receive pictures that are taken at a sports stadium. The user can specify the geographic area when he arrives, or in advance if he knows the coordinates or address. For example, the user can select an option to block receiving pictures or videos while at his current location.

The user preferences can also specify that a user would not like to receive pictures or videos that show only the user's side profile. Similarly, the user preferences can specify that the user would not like to receive pictures or videos where the user is not facing the camera.

The user preferences can also specify the minimum and/or maximum resolution for pictures or videos that the user would like to receive. For example, a user may want to receive low resolution videos and high resolution pictures.

The user preferences can also specify who else may appear in a picture or video with a user. For example, a user may want only pictures and videos of himself and his wife/family.

The user preferences can also specify that the user would only like pictures and/or videos where he is in the center of a group. Individual preferences can also be constructed using Boolean logic, such as a preference for "condition 1" AND "condition 2" AND NOT "condition 3." As is evident, there can be any number of different user preferences, and the various aspects are not limited to those disclosed here.

The user preferences can also specify that instead of the user being immediately presented with a picture or video every time someone captures a picture or video, the user may prefer to have all the pictures matching his or her criteria downloaded to the UE. Then, when the user leaves the location, the UE can display a message notifying the user of the number of pictures and/or videos received while the user was at the location. The user can then view the pictures and/or videos.

At 620, UE 605 stores the filter in local memory. Alternatively, UE 605 can store the filter on a remote server so that it can be accessed by multiple devices. The filter can be stored in a common data format, such as XML.

At 630, UE 605 receives a message that another user has picture(s) and/or video(s) to share. The other UE may be a nearby UE that has just taken a picture or captured a video, or it may be a UE that has just entered the same WLAN as UE 605 and has pictures and/or videos that have been marked as shareable.

At 640, UE 605 sends the filter and (optionally) a picture of its user's face to the UE from which it received the notification. If none of the filter parameters require the UE sharing the pictures and/or videos to identify the face of UE 605's user, then UE 605 does not need to send a picture of the user's face. Alternatively, if the user of UE 605 does not wish to share a picture of his or her face, or if a picture of the user's face is not available, then UE 605 will not send a picture of the user's face.

In an aspect, 630 is an optional feature and the flow may instead proceed from 620 to 640. That is, rather than waiting for a notification that another UE has pictures and/or videos to share, UE 605 may actively send a request to nearby UEs asking them to share pictures and/or videos meeting its criteria.

At 650, UE 605 receives any pictures and/or videos meeting the filter parameters (i.e. user preferences). If none do, UE 605 may receive nothing or may receive a message indicating that no pictures and/or videos match the user's preferences.

Figure 7:
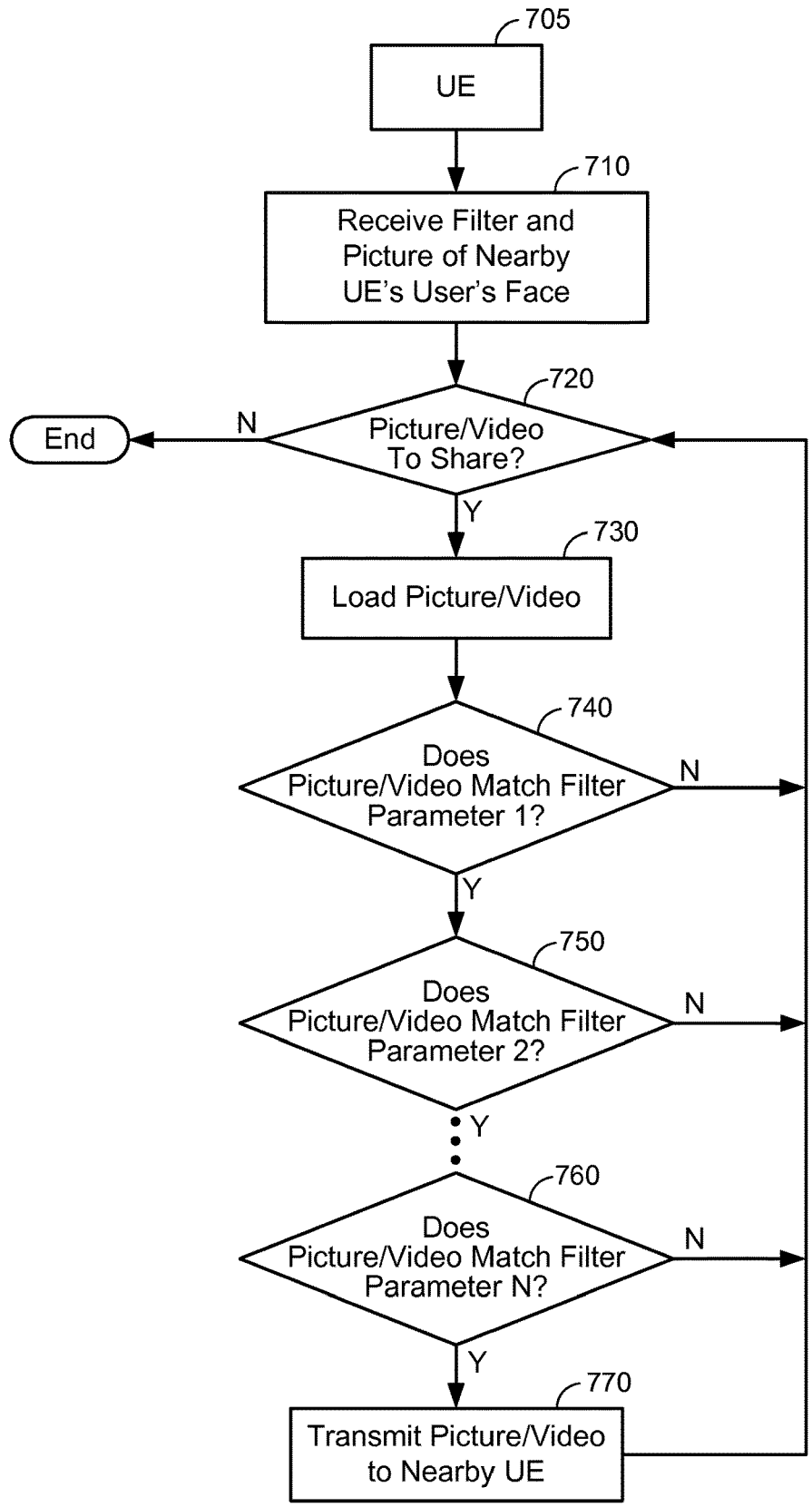
FIG. 7 illustrates an exemplary flow of an aspect in which a UE determines whether shareable pictures and/or videos meet another user's preferences.

FIG. 7 illustrates an exemplary flow of an implementation in which a UE determines whether shareable pictures and/or videos meet another user's preferences. At 710, UE 705 receives a nearby user's filter of user preferences and a picture of the user's face. The filter and picture may be received in response to UE 705 sending a notification that it has pictures and/or videos to share, or the nearby UE may transmit the filter and picture without any prompting from UE 705.

The picture of the user's face is optional because the user's preferences may not include preferences regarding whether or not the user's face is in the pictures and/or videos. Alternatively, if the user of UE 705 does not wish to share a picture of his or her face, or if a picture of the user's face is not available, then UE 705 will not send a picture of the user's face.

At 720, UE 705 determines whether it has a picture and/or video to share. If it does, then at 730, UE 705 loads the picture or video. If UE 705 has multiple pictures and/or videos to share, UE 705 loads a first picture or video at 730.

At 740, UE 705 determines whether the picture or video matches the first filter parameter. This may include acquiring other information, such as the location of the UE 705, the location of the nearby user, the resolution of the picture or video, the identities of any other people in the picture or video, and the like.

If the picture or video matches the first filter parameter, then at 750, UE 705 determines whether the picture or video matches the second filter parameter. If it does, then UE 705 continues comparing the picture or video against the filter parameters until it reaches the Nth filter parameter. At 760, UE 705 determines whether the picture or video matches the Nth filter parameter.

If the picture or video matches the filter parameters 1 to N, then at 770, UE 705 transmits the picture or video to the nearby UE. Transmitting the picture or video may include some post processing, such as shortening the video, reducing the resolution of the picture, and the like.

If the picture or video does not match one of the filter parameters, then the flow returns to 720, where UE 705 determines whether there is another picture or video to share. If there is, then the flow proceeds to 730. If there is not, then the flow ends.

When there are no more pictures or videos to share, UE 705 may send a message to the nearby UE indicating that it has transmitted all the pictures and/or videos it has to share. If UE 705 did not share any pictures and/or videos with the nearby UE, then it may send a message to the nearby UE indicating that none of its pictures and/or videos matched the other user's preferences.

In an implementation, not only may UEs request pictures or videos meeting their users' preferences, the UE sharing the pictures or videos may set preferences regarding whether to share the pictures or videos. The sharing UE may deny requests for pictures and/or videos, only permit the sharing of reduced resolution pictures and/or videos, require a license for shared pictures and/or videos, and the like.

The user of the sharing UE may also choose which pictures to share based on that user's preferences. The sharing user's preferences may be similar to the requesting user's preferences, and include filter parameters such as how much of the user is visible in the picture or video, the location the picture or video was taken, the position of the user in the picture or video, the resolution of the picture or video, and the like. Where the sharing user sets sharing preferences, the parameters 1 to N checked in 740 to 760 would include not only the received filter parameters, but also the user's filter parameters.

In an implementation, a user could capture a long video of an event, such as a sporting event, and instead of sharing the entire video with other users; the user's preferences could specify that only the key moments should be shared. This may require the UE to have special software capable of identifying key moments in a video, or the user may manually identify the key moments.

In an implementation, the sharing UE can limit the number of other UEs it shares pictures or videos with based on the number of other UEs, its battery capacity, its network connection quality, the battery capacity of the other UEs, the network connection quality, and the like.

In an implementation, the UEs communicate over a P2P network, such as a Wi-Fi or Bluetooth network. However, the UEs can also communicate over non-peer networks, such as cellular networks or server-brokered networks.

In an implementation, one user may act as an agent for another (i.e. principle) user. A user can set preferences indicating the types, locations, formats, subjects, etc. of pictures he or she would like to have. These preferences would be in addition to the preferences discussed above regarding the sharing of pictures with nearby users. Alternatively, these may be the only preferences a UE shares. The principle UE can share these preferences with other users by pushing them to other UEs or by responding to a request for the user's preferences, as discussed above. When an agent UE detects that its user's activity meets the principle user's preferences, it notifies the user to capture the appropriate picture or video.

Figure 8:
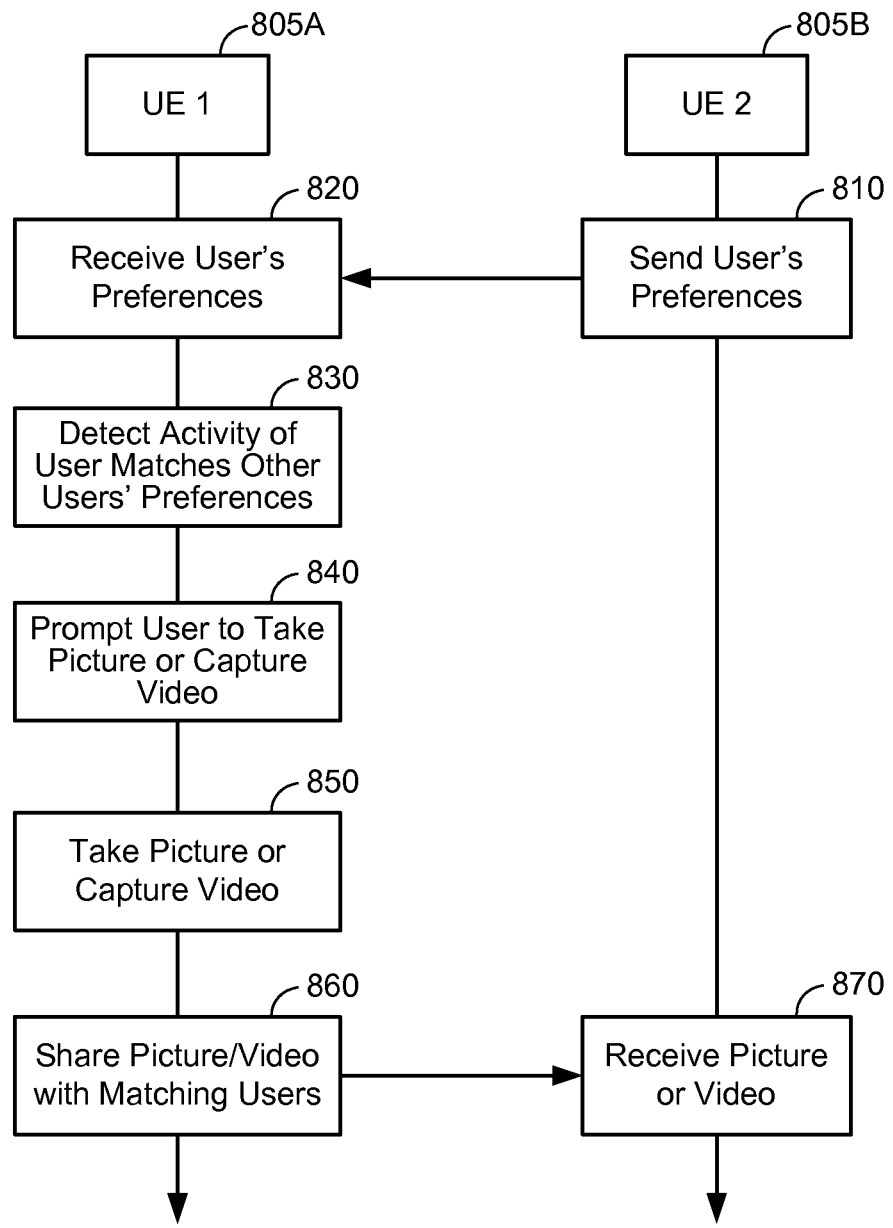
FIG. 8 illustrates an exemplary flow of an aspect where one user acts as an agent for another user.

FIG. 8 illustrates an exemplary flow of an implementation where one user acts as an agent for another user. In the example of FIG. 8, the UE 1 805A is the agent and the UE 2 805B is the principle.

At 810, UE 2 805B sends UE 1 805A a filter of user preferences regarding pictures and videos that the user would like to have. If UE 2 805B sends this information in response to a notification from UE 1 805A, the UE 2 805B may also send a picture of its user's face and the filter of user preferences regarding the sharing of pictures and videos, as discussed above.

At 820, UE 1 805A receives UE 2 805B's filter and possibly the user's picture. The UE 1 805A can store the picture and filter in local memory or on a remote server.

At 830, UE 1 805A detects that some activity of the user matches the other user's preferences. This can include the user being at a particular location, taking pictures of particular people, and the like. For example, the user of UE 2 805B may want a picture of the Eiffel tower and share that preference with UE 1 805A. The preferences may include the coordinates of the Eiffel tower, rather than just the name, so that there is no ambiguity and so that the UE 1 805A does not have to determine the coordinates.

At 840, the UE 1 805A prompts the user to capture the specified picture or video. The alert can include the name of the requesting/principle user and any other criteria that that user may have set, such as the orientation of the camera, the time of day, the angle, and the like. At 850, the UE 1 805A takes the picture or captures the video. The UE 1 805A then stores the picture or video, either locally or remotely.

At 860, the UE 1 805A shares the picture or video with the UE 2 805B. The UE 1 805A may share the picture or video right away, even if it is not near UE 2 805B, or it may wait until it is near UE 2 805B. If UE 1 805A shares the picture or video right away and UE 2 805B is not nearby, it may send the picture over a wireless network, such as network 104 or 106. The UE 1 805A may upload the picture or video to a remote server or send it in a multimedia messaging service (MMS) message.

At 870, UE 2 805B receives the picture or video. Alternatively, the UE 2 805B may receive a reference to the picture or video which it can then download from a remote server.

As can be seen, the various implementations allow users to control the sharing and acquisition of pictures and/or videos automatically according to their preferences. The pictures and/or videos can be obtained in P2P or network assisted environments. For example, a user can go to a party and not only obtain the pictures he or she wants, but also prevent other users from sending him or her pictures the user does not want. This saves the user's time (the user doesn't have to delete unwanted files) and battery power. This also makes sharing pictures and videos more relevant to the user.

In an implementation, after a UE captures a picture or video and transfers it to a UE belonging to one of the people in it, if the sending UE's battery's charge level is below a threshold, the UE can ask the other UE to share the picture or video with the other nearby UEs. The sending UE may determine that the other UE's battery level is above a threshold, such as 20%.

The various implementations save wireless network bandwidth and reduce congestion by using P2P networks. Further, the various implementations improve privacy concerns by helping the users better control what they would like or not like to receive.

Figure 9:
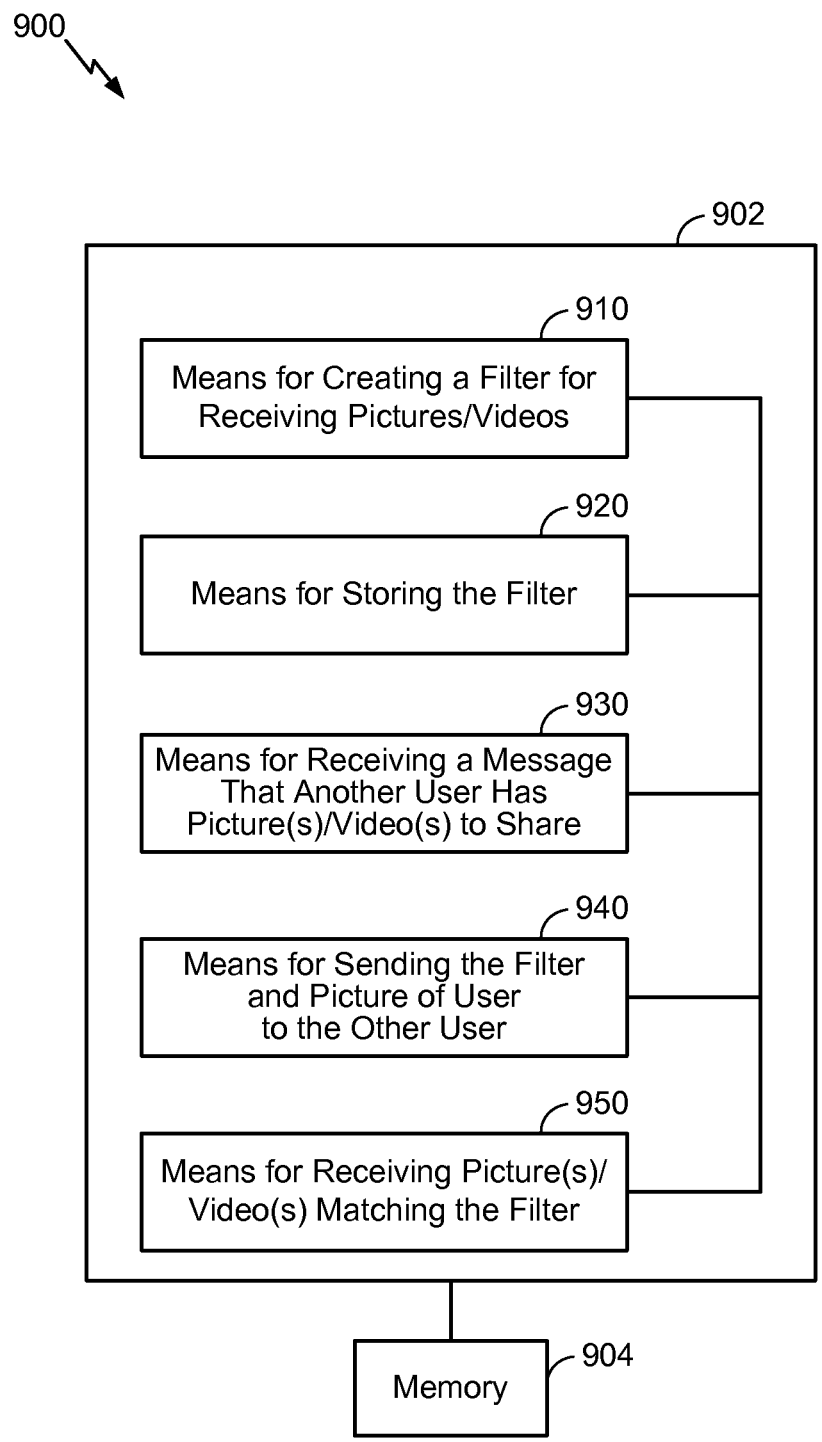
FIG. 9 illustrates an exemplary apparatus according to an aspect in which a user sets and shares his or her picture and video sharing preferences with other users.

FIG. 9 illustrates an exemplary apparatus 900 according to an implementation in which a user sets and shares his or her picture and video sharing preferences with other users. A processor 902 is coupled to a memory 904. Processor 902 comprises means for creating a filter for receiving pictures and/or videos, 910, means for storing the filter, 920, means for receiving a message indicating that another user has picture(s) and/or video(s) to share, 930, means for sending the filter and a picture of the user's face to the other user, 940, and means for receiving picture(s) and/or video(s) matching the filter, 950.

Figure 10:
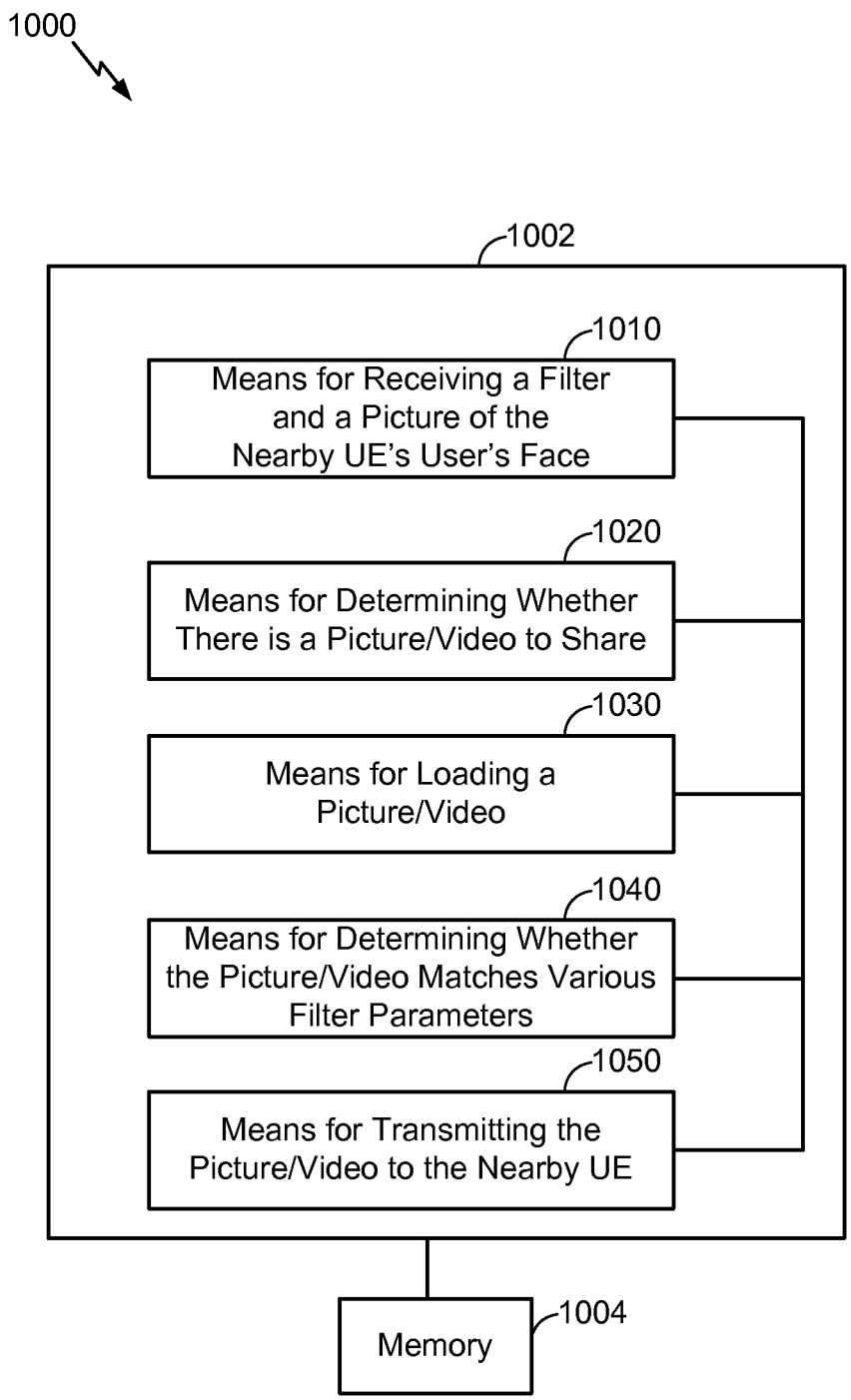
FIG. 10 illustrates an exemplary apparatus according to an aspect in which a UE determines whether shareable pictures and/or videos meet another user's preferences.

FIG. 10 illustrates an exemplary apparatus 1000 according to an implementation in which a UE determines whether or not shareable pictures and/or videos meet another user's preferences. A processor 1002 is coupled to a memory 1004. Processor 1002 comprises means for receiving a filter and a picture of a nearby UE's user's face, 1010, means for determining whether the UE has a picture or video to share, 1020, means for loading the picture or video, 1030, means for determining whether the picture or video matches various filter parameters, 1040, and means for transmitting the picture or video to the nearby UE, 1050.

Figure 11:
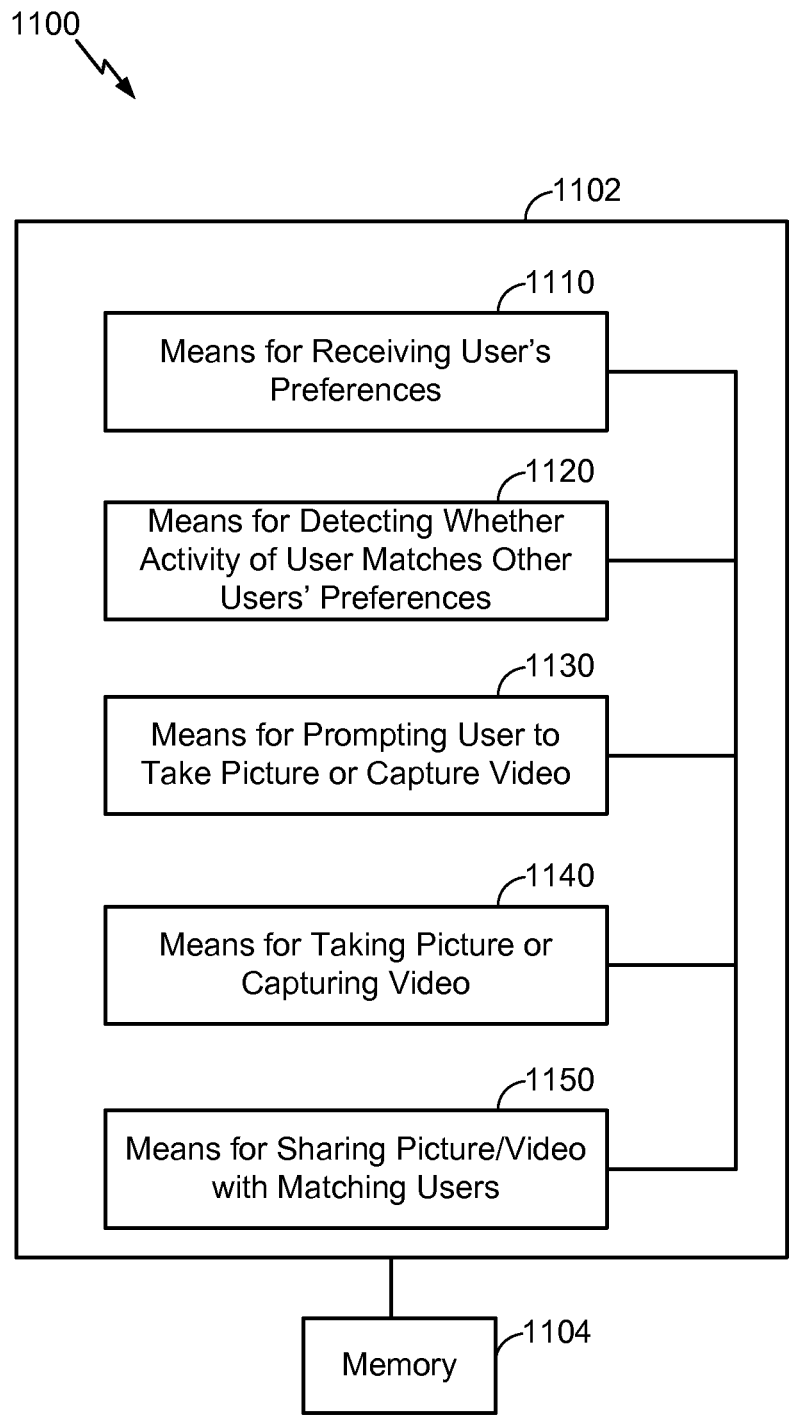
FIG. 11 illustrates an exemplary apparatus according to an aspect where one user acts as an agent for another user.

FIG. 11 illustrates an exemplary apparatus 1100 according to an implementation where one user acts as an agent for another user. A processor 1102 is coupled to a memory 1104. Processor 1102 comprises means for receiving a user's preference, 1110, means for detecting whether activity of the first user matches the other user's preferences, 1120, means for prompting the user to take a picture or capture a video, 1130, means for taking the picture or capturing the video, 1140, and means for sharing the picture or video with the matching users, 1150.

The various means disclosed with reference to FIGS. 9-11 can be embodied in discrete elements, software modules executed on a processor or any combination of software and hardware to achieve the functionality disclosed herein, as disclosed below.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, means, and algorithm steps described in connection with the implementations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, means, and circuits described in connection with the implementations disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, means, sequences and/or algorithms described in connection with the implementations disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary implementations, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-Ray disc where disks usually reproduce data magnetically, while discs reproduce data optically with lasers. Combinations of the above should also be included within the scope of computer-readable media.

While the foregoing disclosure shows illustrative implementations of the disclosure, it should be noted that various changes and modifications could be made herein without departing from the scope of the disclosure as defined by the appended claims. The functions, steps, and/or actions of the method claims in accordance with the implementations of the disclosure described herein need not be performed in any particular order. Furthermore, although elements of the disclosure may be described or claimed in the singular, the plural is contemplated unless limitation to the singular is explicitly stated.

What is claimed is:

1. A method for content sharing, comprising:
defining, at a user device, one or more parameters for receiving sharable content from another device;
receiving, at the user device, a notification from a content device indicating that the content device has sharable content, wherein the content device is a client device;
sending, by the user device, a request including the one or more parameters to the content device to identify desired content from the sharable content, the request including an indication of an identification of one or more users; and
receiving, at the user device, the desired content from the content device, wherein the desired content matches the one or more parameters and includes an image of at least one of the one or more users.

2. The method of claim 1, wherein the one or more parameters are stored on the user device that received the desired content prior to receiving the notification.

3. The method of claim 1, wherein, in response to receiving the one or more parameters, the content device:
accesses a first content on the content device;
compares the first content to the one or more parameters; and
transmits the first content as the desired content based on the first content matching the one or more parameters.

4. The method of claim 1, further comprising:
establishing a peer-to-peer connection between the content device and the user device that receives the desired content.

5. The method of claim 1, further comprising:
establishing a connection to a server that arbitrates between the content device and the user device that receives the desired content.

6. The method of claim 1, wherein the content device:
stores the one or more parameters on the content device; and
prompts a user of the content device to obtain content for sharing based on the one or more parameters.

7. The method of claim 6, wherein the content device matches at least one of the one or more parameters to a current activity of the content device.

8. The method of claim 7, wherein the sharable content includes a picture or a frame of a video, the at least one of the one or more parameters identifies an object of interest, and the current activity of the content device is capturing the picture or the frame of the video near the object of interest.

9. The method of claim 8, wherein the object of interest includes at least one of the one or more users.

10. The method of claim 1, wherein the receiving comprises
receiving the notification from the content device in response to the content device joining a wireless network to which the user device receiving the notification belongs.

11. The method of claim 1, wherein the content device sends the notification in response to a user action at the content device.

12. The method of claim 11, wherein the user action is activating a shutter action of a camera of the content device.

13. The method of claim 1, wherein the content device sends the notification in response to an amount of time since the sharable content was captured being greater than a threshold.

14. The method of claim 1, wherein a user of the content device defines a second set of one or more parameters having at least one parameter for sharing the sharable content.

15. The method of claim 14, wherein the content device shares the sharable content based on the second set of one or more parameters.

16. The method of claim 1, wherein the one or more parameters include the indication of the identification.

17. The method of claim 1, wherein the one or more users include a user of the user device.

18. The method of claim 1, wherein the indication of the identification of the one or more users includes an image of at least one of the one or more users.

19. An apparatus for content sharing, comprising:
at least one processor of a user device configured to:
define one or more parameters for reception of sharable content from another device;
receive a notification from a content device indicating that the content device has sharable content, wherein the content device is a client device;
send a request including the one or more parameters to the content device to identify desired content from the sharable content, the request including an indication of an identification of one or more users; and
receive the desired content from the content device, wherein the desired content matches the one or more parameters and includes an image of at least one of the one or more users.

20. The apparatus of claim 19, wherein the one or more parameters are stored on the user device prior to reception of the notification.

21. The apparatus of claim 19, wherein, in response to reception of the one or more parameters, the content device:
accesses a first content on the content device;
compares the first content to the one or more parameters; and
transmits the first content as the desired content based on the first content matching the one or more parameters.

22. The apparatus of claim 19, wherein the at least one processor is further configured to:
establish a peer-to-peer connection between the content device and the user device.

23. The apparatus of claim 19, wherein the at least one processor is further configured to:
establish a connection to a server that arbitrates between the content device and the user device.

24. The apparatus of claim 19, wherein the content device:
stores the one or more parameters on the content device; and
prompts a user of the content device to obtain content for sharing based on the one or more parameters.

25. The apparatus of claim 24, wherein the content device matches at least one of the one or more parameters to a current activity of the content device.

26. The apparatus of claim 25, wherein the sharable content includes a picture or a frame of a video, the at least one of the one or more parameters identifies an object of interest, and the current activity of the content device is capturing the picture or the frame of the video near the object of interest.

27. The apparatus of claim 19, wherein the at least one processor being configured to receive the notification comprises the at least one processor being configured to receive the notification from the content device in response to the content device having joined a wireless network to which the user device belongs.

28. The apparatus of claim 19, wherein the content device sends the notification in response to a user action at the content device.

29. The apparatus of claim 28, wherein the user action is activation of a shutter action of a camera of the content device.

30. The apparatus of claim 19, wherein the content device sends the notification in response to an amount of time since the sharable content was captured being greater than a threshold.

31. The apparatus of claim 19, wherein a user of the content device defines a second set of one or more parameters having at least one parameter for sharing the sharable content.

32. The apparatus of claim 31, wherein the content device shares the sharable content based on the second set of one or more parameters.

33. The apparatus of claim 26, wherein the object of interest includes at least one of the one or more users.

34. The apparatus of claim 19, wherein the one or more parameters include the indication of the identification.

35. The apparatus of claim 19, wherein the one or more users include a user of the user device.

36. The apparatus of claim 19, wherein the indication of the identification of the one or more users includes an image of at least one of the one or more users.

37. An apparatus for content sharing, comprising:
means for defining, at a user device, one or more parameters for reception of sharable content from another device;
means for receiving, at the user device, a notification from a content device indicating that the content device has sharable content, wherein the content device is a client device;
means for sending, by the user device, a request including the one or more parameters to the content device to identify desired content from the sharable content, the request including an indication of an identification of one or more users; and
means for receiving, at the user device, the desired content from the content device, wherein the desired content matches the one or more parameters and includes an image of at least one of the one or more users.

38. A non-transitory computer-readable medium for content sharing, comprising:
at least one instruction to define, at a user device, one or more parameters for reception of sharable content from another device;
at least one instruction to receive, at the user device, a notification from a content device indicating that the content device has sharable content, wherein the content device is a client device;
at least one instruction to send, by the user device, a request including the one or more parameters to the content device to identify desired content from the sharable content, the request including an indication of an identification of one or more users; and
at least one instruction to receive, at the user device, the desired content from the content device, wherein the desired content matches the one or more parameters and includes an image of at least one of the one or more users.

\* \* \* \* \*